United States Patent

[11] 3,545,646

[72] Inventor Henry N. La Croix
    East Orange, New Jersey
[21] Appl. No. 792,591
[22] Filed Jan. 21, 1969
[45] Patented Dec. 8, 1970
[73] Assignee Foster Wheeler Corporation
    Livingston, New Jersey
    a corporation of New York

[54] DECANTER INLET DISTRIBUTOR
    3 Claims, 2 Drawing Figs.
[52] U.S. Cl. .................................................. 220/86,
    220/22
[51] Int. Cl. .................................................. B65b 3/00
[50] Field of Search ........................................... 220/86, 22

[56] References Cited
    UNITED STATES PATENTS
2,104,132  1/1938  McGillicuddy et al. ...... 220/86(AT)
3,172,556  3/1965  Stiefel .......................... 220/22

Primary Examiner— Raphael H. Schwartz
Attorneys—John Maier, III, Marvin A. Naigur and Constantine A. Michalos ABSTRACT: The instant invention relates to a distributor comprised of vertical and horizontal partitions positioned proximate the end head of a cylindrical decanter vessel. The partitions are located to form a clearance opening with respect to the head and the vertical partition has radial slots.

PATENTED DEC 8 1970

3,545,646

DECANTER INLET DISTRIBUTOR

BACKGROUND OF THE INVENTION

Vessels which receive mixtures of water containing carbon black and naphtha used to extract the carbon black from the water, develop the formation of emulsions between the water, naphtha and carbon black. Similar problems have proven very troublesome from the standpoint of making a good separation of the oil and water phases.

It has been the practice to install a fishtail construction in such vessels comprising an extension of the inlet nozzle which has heretofore been located on the centerline of the vessel head at the inlet end and projected into the vessel approximately 800mm. The location of this fishtail construction has been substantially on the centerline of the longitudinal axis of the drum for discharging a thin, flat stream having a width of approximately 600 mm. compared to the full drum width of nearly 1,500 mm. The effect of this fishtail construction is to provide a jet stream of the feed, moving forward at the centerline of the drum, regardless of the location of the liquid interface between the naphtha and the water, and to create turbulance at any emulsion layer. The prior experience has shown that separation of the phases and elimination of emulsion formation has been difficult if not impossible.

It is therefore the main object of the present invention to provide a feed distributor which overcomes these problems.

SUMMARY OF THE INVENTION

In accordance with an illustrative embodiment demonstrating features and advantages of the present invention, there is provided a distributor for use in a cylindrical decanter vessel having a horizontal axis. The distributor, which is located within the end head of the decanter, includes a vertical partition transverse to the inlet and extending above, toward the inside of the head and below for a suitable distance, and a horizontal partition which is located below the inlet extending back toward the inside of the head. The partitions have aperture means to permit low velocity flow from the inlet through the partitions along the length of the decanter. Preferably the edge of the horizontal partition is secured to the bottom of the vertical partition. The partitions have narrow clearance openings along the inside of the head, and the vertical partition has radial slots therein.

BRIEF DESCRIPTION OF THE DRAWINGS

The above brief description, as well as further objects, features and advantages, of the present invention will be more fully appreciated by reference to the following detailed description of a presently preferred but nonetheless illustrative embodiments in accordance with the present invention, when taken in connection with the accompanying drawings wherein.

DESCRIPTION OF THE PREFERRED EMBODIMENT

Figure 1:
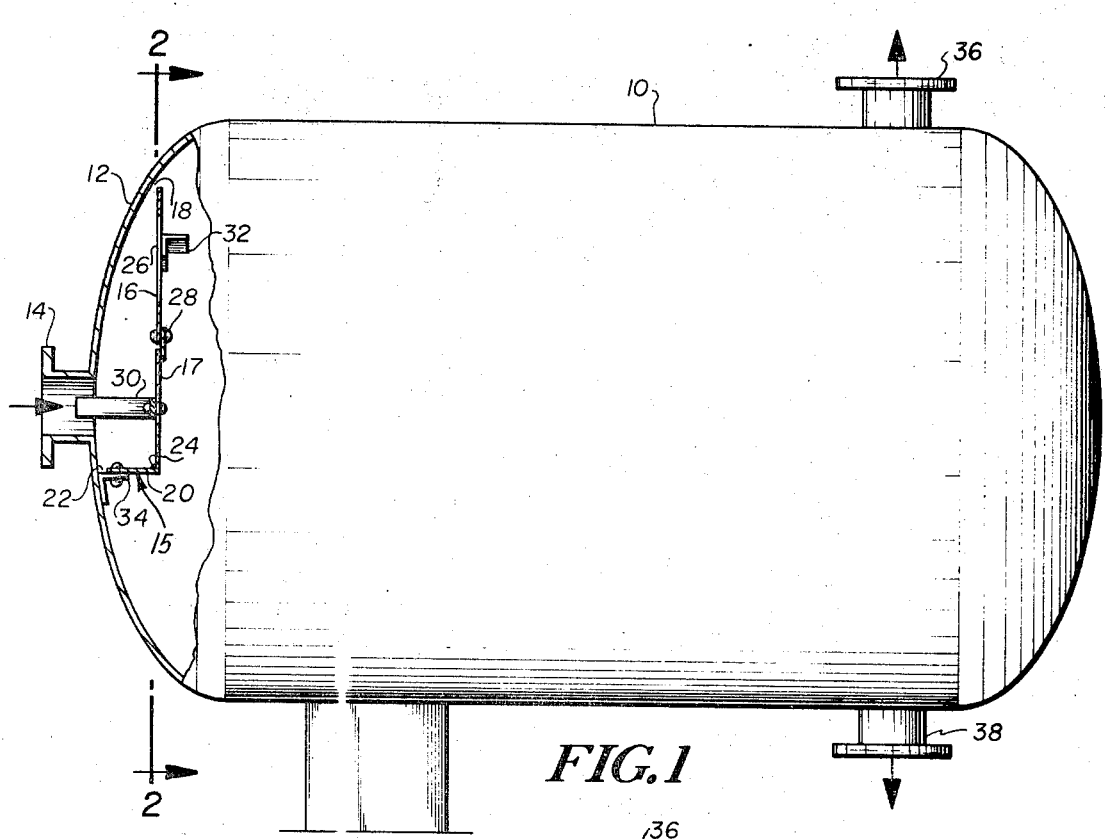
FIG. 1 is an elevational view of a decanter with portions broken away and sectioned to show the distributor of the present invention.

With reference to FIG. 1, in accordance with the present invention there is provided a decanter 10 including an end head 12 formed with an inlet 14. Mounted within the head 12 is a distributor 15 which includes a vertical partition 16, transverse to the inlet 14 and spaced from the inlet 14. The partition 16 extends upwardly toward the inside of the head 12 conforming to the shape thereof, but leaving a uniform narrow gap or clearance 18 therefrom, for example, 1 mm., for the passage of lighter phase material such as naphtha therebeyond.

The distributor 15 also includes a horizontal partition 20 mounted in the head 12 and spaced below the inlet 14, preferably about one diameter thereof. The partition 20 extends back toward the inside of the head 12 conforming to the shape thereof, but leaving a narrow gap or clearance 22 therefrom greater than the upper gap or clearance 18, for example 2 mm., for the passage therebeyond of heavier phase material such as water. The inner edge of the horizontal partition 20 is preferably secured as by welding 24 to the bottom of the vertical partition 16.

Figure 2:
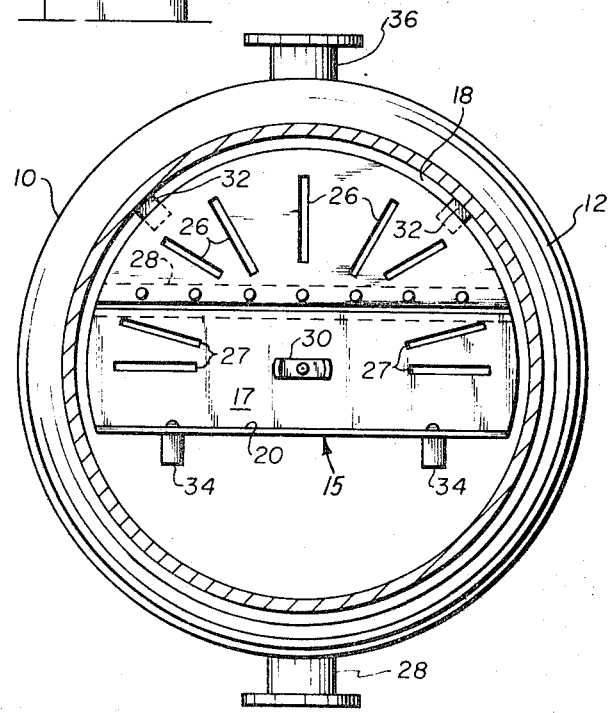
FIG. 2 is a transverse sectional view of the decanter taken along the line 2–2 of FIG. 1 and looking in the direction of the arrows.

The vertical partition 16 is provided with apertures therein which, like the clearance or gap 18, permit low velocity flow from the inlet 14 past the partition 16 for the greater length of the decanter 10. Preferably these apertures are formed by radial slots 26 and 27 as shown in FIG. 2.

For convenience in installation, the vertical partition is made in upper and lower parts bolted together at 28, and the lower part 17 is bolted to a supporting bracket 30 secured to the head 12, preferably inside the inlet 14. The upper portion is secured to the head 12 by brackets 32. The horizontal partition 20 is supported by brackets 34 also secured to the inside of the head 12.

In the form of the invention shown, the decanter 10 is provided with an upper outlet 36 for lighter phase materials, and a lower outlet 38 for heavier phase materials.

In operation, it will first be noted that the inlet stream of mixed feed enters against a blind section 17 of vertical partition 16 which stops forward motion longitudinally in the drum and changes the direction of flow at least 90°, thus eliminating any jet action in the drum. For example, the vertical partition 16 with blind section 17 can be located about 150 mm. from the end of the inlet nozzle 14, or about two nozzle diameters away from the head 12. By comparison with the previous practice of using fishtail distributors which projected about 800 mm. inside the inlet head, the new distributor location in accordance with the present invention saves the difference or about 650 mm. of the effective length of the decanter.

There is a reasonable volume provided behind the entire distributor which slows down all liquid velocities, and which allows all heavy phase material, such as water, to separate immediately and to join the heavy phase layer. The remaining feed which is a mixture of coarse and fine globules of water and oil rise to the point where their density is equal to or less than that of the phase on the opposite side of the distributor 15. If the water level in the decanter is located for example at the 70 percent point of the diameter of the decanter 10, oil will not flow through any openings 26 or 27 in the distributor 15 until the liquid on the inlet side of the distributor 15 is generally the same as that on the outlet side of the distributor 15. All of the water which has separated behind the inlet side of distributor 15 which has not dropped out through the bottom of the distributor 15 at the slot 22 against the head 12, can flow out of the radial slots 27 located at the centerline of the decanter 10, and through such other slots 26 as are below the level of the water interface. Such water as flows out through these horizontal slots 27 is distributed at low velocity across nearly 40 percent of the drum diameter, and located in zones about equally spaced in a horizontal plane at the level of the slot 27, providing as nearly uniform flow as possible toward the opposite end of the drum.

Naphtha and entrained droplets of water accumulate behind the distributor and slowly flow through the radial slots extending upward to about 83 percent of the diameter of the decanter 10, and outwardly across the end of the decanter 10 to encompass about 60 percent of the upper cross-sectional area of the decanter 10 at the point of leaving the distributor 15.

The net effect is to feed the naphtha feed into the naphtha phase uniformly and smoothly, so that the naphtha layer is gently pushed from the inlet head to the outlet head. During this horizontal movement the heavier droplets of water settle from the naphtha layer and join the water layer at the interface. Likewise, any entrained droplets of naphtha which were carried in the water phase through slots 18, 22, 26, 27 of the distributor 15 and rise slowly to the interface and join the naphtha phase.

The positive but gentle longitudinal movement of the two main body fluids is ideal for separating the droplet materials of the opposite fluid with the least amount of hindering and remixing. The whole length of the decanter 10 is available for effecting the separation and there are no jet streams or streams of high energy values to interfere with the gentle flow. The position of the distributor 15 is such that there is no pressure drop energy other than gravity and very gentle displacement by feed from behind the distributor 15 to direct the liquid flow patterns in the decanter 10.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A decanter comprising:
   a horizontal cylindrical shell and an end head having a mixture feed inlet therein;
   a vertical partition inside said head transverse to said inlet and extending thereabove toward the inside of said head;
   said vertical partition extending below the center of said inlet, and said vertical partition extending above said inlet proximate said head with a uniform narrow upper clearance therefrom;
   a horizontal partition below said inlet extending toward the inside of said head; and
   said partitions having aperture means thereby permitting low velocity flow from said inlet past said partitions along the length of said cylinder, 2. A decanter according to claim 1, in which said horizontal partition extends close to the inside of said head with a narrow lower clearance therefrom larger than said upper clearance.

3. A decanter according to claim 2, in which the apertures in said vertical partition are substantially radial slots.